United States Patent [19]
O'Neill et al.

[11] 3,914,124
[45] Oct. 21, 1975

[54] REDUCTION OF NICKEL OXIDE

[75] Inventors: Charles Edward O'Neill, Port Credit; Ramamritham Sridhar, Mississauga; Malcolm Charles Evert Bell, Sudbury, all of Canada

[73] Assignee: The International Nickel Company, Inc., New York, N.Y.

[22] Filed: Mar. 29, 1974

[21] Appl. No.: 456,282

[30] Foreign Application Priority Data
Apr. 9, 1973 Canada .............................. 168235

[52] U.S. Cl. ........................ 75/82; 75/.5 BA; 75/26; 204/112
[51] Int. Cl.$^2$ ............................................. C22B 23/02
[58] Field of Search ............ 75/82, 26, 21, 9, .5 BA; 204/112

[56] References Cited
UNITED STATES PATENTS

| | | | |
|---|---|---|---|
| 2,966,407 | 12/1960 | Renzoni et al. | 75/82 |
| 3,388,870 | 6/1968 | Thumm et al. | 75/21 |
| 3,401,032 | 9/1968 | Renzoni et al. | 75/9 X |
| 3,672,873 | 6/1972 | Huggins | 75/82 |

FOREIGN PATENTS OR APPLICATIONS

| | | | |
|---|---|---|---|
| 614,701 | 2/1961 | Canada | 75/82 |
| 1,058,569 | 2/1967 | Canada | 75/26 |
| 1,169,816 | 11/1969 | Canada | 75/82 |

*Primary Examiner*—C. Lovell
*Assistant Examiner*—M. J. Andrews
*Attorney, Agent, or Firm*—Miriam W. Leff; Ewan C. MacQueen

[57] ABSTRACT

A moving bed of nickel oxide containing volatile impurities and having a controlled sulfur content and at least one additive selected from the group consisting of magnesia, calcium oxide or compounds heat decomposable thereto in an amount sufficient to react with the nickel oxide during reduction to provide an antiagglomerating coating on a substantial portion of the nickel oxide granules is established and is contacted with a reducing gas at temperatures high enough to reduce the nickel oxide and to refine it. The addition agent is advantageously added to the nickel oxide as an aqueous solution of a water soluble compound of magnesium or calcium, e.g., magnesium sulfate or chloride or nitrate. The process is advantageously used in conjunction with high temperature roasting of nickel sulfide, with roasting possibly followed by chlorination to control the copper content, to provide a combination of high temperature treatments that is effective in providing a refined metal product.

48 Claims, No Drawings

REDUCTION OF NICKEL OXIDE

The present invention pertains to the reduction of nickel oxide and more particularly it relates to the direct reduction of nickel oxide.

Many proposals have been made to directly reduce metal oxides to metal, i.e., the direct reduction of metal oxides to the metallic state without an intervening melting step. Most of these processes encounter mechanical problems as a result of the propensity of freshly reduced metal powders to weld together and to stick to the furnace refractories. The welding and sticking of metal powders increases with decreasing particle size and increasing temperatures. When the metal oxide to be reduced is formed into a moving bed, such as in a fluid bed reactor or a rotary furnace, welding becomes an even more severe problem because interparticle welding is promoted by the particles impacting each other.

In order to overcome the problems associated with interparticle welding and sticking to the furnace refractories, reduction temperatures and particle size distribution have been correlated to maximize degrees and rates of reduction while minimizing mechanical problems. It has also been suggested to use inert particles as a mechanically intefering phase to minimize contact between the freshly reduced metallic surfaces. It has generally been assumed that large quantities, e.g., 10 percent or more, of the inert particles were required to be effective in controlling sticking. On the other hand, it has been proposed in Canadian Pat. No. 869,475 to reduce highly purified nickel oxide by using exceptionally small quantities of extremely fine, e.g., about one micron or less, inert particles to minimize sticking and to avoid undue contamination of the reduced metal product. This latter process employs hydrogen as a reductant in what appears to be an attempt to minimize introducing contaminants, such as sulfur, from commercially available fuels. Because hydrogen is comparatively expensive, it should not be burned with a free-oxygen-containing gas to generate reducing atmospheres and the hydrogen is best preheated by indirect means to supply heat for the endothermic reduction process. Indirect heating is both expensive and inefficient and limits the practical maximum operating temperatures that can be utilized. For reasons of economy, the spent hydrogen is treated and recycled, adding even more to the cost of the process.

It has now been discovered that an oxide of at least one non-ferrous metal selected from the group consisting of nickel or cobalt can be reduced and refined to metal in commercially available furnaces at high throughput rates while minimizing sticking.

Generally speaking, the present invention pertains to a process for reducing non-ferrous oxide particles of at least one metal selected from the group consisting of nickel and cobalt. In a reactor, a moving bed of non-ferrous oxide particles containing at least one volatile impurity selected from the group consisting of antimony, arsenic, bismuth, lead, selenium, sulfur, tellurium, tin, and zinc, the total volatile impurity content exceeding about 0.01 percent and the sulfur content being between about 0.005 percent and 0.5 percent, and of at least one additive selected from the group consisting of calcium oxide, magnesia or compounds heat decomposable thereto, the additive being present in small but effective amounts to react with the non-ferrous oxide to form an antiagglomerating coating on a substantial portion of the particles to minimize sticking in the moving bed, is established and is contacted with a reducing atmosphere at a temperature high enough to reduce the non-ferrous oxide to metal and to lower the volatile impurity content. In an advantageous embodiment, a carbonaceous fuel and a free-oxygen-containing gas are combusted to generate an atmosphere reducing to the non-ferrous oxide and to maintain the reducing temperature.

Any form of nickel or cobalt oxide, hydroxide, carbonate, mixed carbonates and hydroxides, or nitrate can be reduced to metal by the process in accordance with the present invention. For example, filter cakes obtained by precipitating nickel or cobalt hydroxide from leach solutions are readily treated, advantageously after agglomeration, by the process in accordance with the present invention. As noted hereinbefore, both nickel and cobalt oxides can be treated by the process in accordance with the present invention. However, the invention will be described hereinafter only in terms of nickel oxide to facilitate the description of the process itself. The process is even more useful in treating nickel oxides produced by roasting finely divided nickel sulfide (e.g., $Ni_3S_2$) at temperatures above its incipient fusion temperature (i.e., its softening temperature). The process, however, finds its greatest use in the treatment of nickel oxide granules (i.e., nickel oxide having a particle size distribution of at least about 25% plus 48 mesh Tyler Screen Size [TSS]) produced by fluid bed roasting of pelletized nickel sulfide above its softening temperature. Particulate nickel oxide containing up to about 2 percent cobalt, up to about 2 percent iron, copper in amounts such that the nickel to copper ratio is greater than about 75:1, at least one volatile impurity selected from the group consisting of antimony, arsenic, bismuth, lead, selenium, sulfur, tellurium, tin and zinc, the total volatile impurity content being greater than about 0.01 percent and the sulfur content being between about 0.005 percent and 0.5 percent, and minor amounts of gangue materials, such as silica, alumina, magnesia and calcium oxide is advantageously treated by the process in accordance with the present invention. Sufficient refining takes place during reduction so that the nickel oxide can contain the volatile impurities in much higher amounts, e.g., a total volatile impurity content of about 0.1 percent, or even 0.2 percent, and the temperature and length of the time the material is held at reducing temperatures can be adjusted to lower the total volatile impurity content to about 0.05 percent or less, e.g., 0.01 percent. It is to be noted that all compositions given herein are on a weight basis, except for gases which are given on a volumetric basis.

A starting material of nickel sulfide or subsulfide which contains at least one volatile impurity selected from the group consisting of antimony, arsenic, bismuth, lead, selenium, tellurium, tin and zinc is heated to a temperature above 500°C. in a free-oxygen-containing atmosphere for controlled lengths of time to roast the starting material and to oxidize and volatilize a material amount of the impurity. Advantageously, nickel sulfides are roasted at temperatures between about 500°C. and 1200°C. in a free-oxygen-containing gas. Roasting is advantageously conducted in a fluid bed reactor which provides good gas-solid contact for the roasting reactions and high gas flows that promote volatilization of the impurities. The combination of high temperature roasting followed by high temperature reduction, particularly reduction temperatures above about 850°C., is effective in providing high throughput rates and refined products containing less than about 0.01 percent lead, less than about 0.005 percent antimony and bismuth, less than about 0.002 percent selenium, tellurium, tin and zinc, less than about 0.1 percent arsenic or sulfur and less than about 1 percent oxygen, the total volatile impurity content being less than about 0.1 percent. The low lead and bismuth contents of the final products are particularly significant because these elements are highly deleterious in nickel-containing alloys. Thus, the steps of high temperature roasting and high temperature reduction combine to form an integrated process which provides a refined nickel metal product that is suitable for most alloying purposes.

If the nickel compound to be reduced is derived from a leach solution, the solution can, before precipitating the nickel values, be treated to initially precipitate any copper so that the finished nickel product does not contain unduly large quantities of copper. When starting with nickel sulfide, the sulfide can be roasted and the resulting calcine, if it contains material amounts of copper, can be chlorinated to lower the copper content to acceptable levels, i.e., the copper to nickel ratio can be lowered to less than about 1:75, e.g., less than about 1:100 or even lower. Chlorination of the calcine is best conducted in a fluid bed reactor and at a temperature between about 500°C. and 1200°C., advantageously at the higher end of the range (e.g., in excess of about 1100°C.). Gaseous chlorine in amounts equal to about 0.5 to 7 percent by weight of the nickel oxide is fed to the fluidized bed while maintaining the atmosphere within the bed non-reducing to nickel oxide. Under these conditions the copper content of the calcine will be lowered to provide a calcine having a nickel to copper ratio greater than about 75:1 while the levels of other chlorinatable impurities, such as antimony, bismuth, lead and zinc are materially lowered. Although the chlorination treatment has been described in terms of refining roasted calcines, it will be appreciated by those skilled in the art that all oxides, carbonates or hydroxides, regardless of how produced, can be calcined and refined in a like manner.

An important feature of the present invention is the presence of between about 0.005 and 0.5 percent, advantageously between about 0.02 to 0.3 percent, sulfur in the nickel oxide. The sulfur in the oxide can be introduced by addition of easily decomposable sulfates like $H_2SO_4$, $NiSO_4$, $MgSO_4$, etc., or by gaseous sulfation with $SO_2$, $H_2S$ or other sulfur-bearing gases. If the nickel oxide is produced by high temperature roasting of nickel sulfide, the roasting temperature and time can be controlled to give the desired sulfur levels in the product. Any final sulfur adjustment can be made by introducing sulfur containing compounds to the fluid bed roaster calcine over a wide range of temperatures from room temperature to roasting temperature. A remarkable aspect of the present invention is that sulfur can be added to the oxide in amounts sufficiently great to catalyze reduction, even in the presence of the sulfur-getting additive employed to minimize sticking, and is partially eliminated after serving its catalytic function to provide a refined product.

Another important feature of the present invention is the use of at least one additive selected from the group consisting of calcium oxide, magnesia oxide and compounds heat decomposable thereto. Examples of such additives are lime, limestone, magnesia, dolomite, magnesium chloride, magnesium sulfate, magnesium nitrate, calcium chloride, calcium nitrate, magnesium carbonate, etc. The additive performs at least two distinct functions. Because the additives have a high affinity for sulfur, particularly under reducing conditions, the additives act as getters for sulfur introduced through the fuel and can also extract most of the sulfur contained in the nickel oxide, however introduced. The affinity of the additives for sulfur allows direct firing with commercially available fuels while minimizing contamination of the reduced nickel product with sulfur. The desulfurizing capabilities of these additives also allow the use of sulfur as a reduction catalyst without producing a product having an unduly high sulfur content. The second function of the additives is to minimize sticking by reacting with the non-ferrous oxide during reduction. Even if the fuel or the nickel oxide contains tolerable amounts of sulfur, it has been found that the use of basic oxides to minimize sticking is advantageous over the use of acidic oxides, such as silica. Acidic oxides can, at the reducing temperatures employed, react to form low melting point reaction products which can actually increase sticking.

The amount, the distribution and the particle size distribution of the solid basic oxide are important parameters if the basic oxide is to perform its two distinct functions. Sulfur control of the final nickel metal and minimization of sticking require that at least about 0.2 percent of the basic oxide, based on the weight of nickel oxide being reduced, be added to the nickel oxide; advantageously the basic oxide is added to the nickel oxide in amounts of at least about 3 percent. No theoretical upper limit for the amount of basic oxide employed exists, but from the viewpoint of apparatus capacity, fuel economy, reagent cost and separation costs, it is advantageous to limit the basic oxide addition to less than about 10 percent, preferably below about 6 percent. Basic oxide additions within the foregoing ranges are adequate to minimize sticking and to desulfurize the metal product.

The effectiveness of the basic oxide in minimizing sticking is dependent, when the basic oxide is added as a solid, upon the particle size of the basic oxide. It has been found that basic oxides having a particle size distribution of about 20 percent minus 200 mesh or about 10 percent plus 20 mesh, and advantageously about 40 percent minus 100 mesh and about 5 percent plus 20 mesh, are most effective in minimizing sticking. The finely divided basic oxide is also effective in controlling sulfur contamination because the fineness of the basic oxide provides good solid-gas and solid-solid contact which are essential in removing sulfur from the reducing atmosphere and from the nickel oxide. The basic oxide is sufficiently coarse to minimize dusting problems and yet sufficiently fine to facilitate subsequent separation from the reduced nickel values by gaseous elutriation.

When reduction is effected in a moving bed reactor, substantial amounts of the basic oxide will be elutriated by the flowing furnace atmosphere and the elutriated basic oxide can be recovered by well known means for use after regeneration or for disposal. If such elutriation occurs prematurely, all the beneficial effect of the oxide in minimizing sticking and sulfur removal will not be realized. Therefore, provisions can be made for introducing at least a portion of the basic oxide to the nickel oxide in the reducing zone, thereby insuring realization of all the benefits of the basic oxide addition.

An advantageous embodiment of the present invention is to introduce the basic oxide or oxides onto the particulate nickel oxide as an aqueous solution. Concentrated, or even dilute, aqueous solutions of one or more water soluble compounds or magnesium or calcium are sprayed onto the particulate nickel oxide. Examples of such compounds, although the invention is not limited thereto, are magnesium chloride, magnesium sulfate, magnesium nitrate, calcium chloride and calcium nitrate. The use of aqueous solutions of one or more water soluble magnesium or calcium compounds is highly advantageous in that introduction in this manner insures a highly uniform coating on the nickel oxide. The term "uniformity" as used herein in relationship to the coating refers to the entire mass of the particulate nickel oxide and not individual particles, which may individually have coatings that are less than uniform in thickness, as well as to the extent of the coating. The uniformity of the coating obtained by this manner of introduction so increases the effectiveness of the basic oxide that far less basic oxide can be introduced to the nickel oxide. Another advantage of this method of introducing the basic oxide is that very little of the basic oxide introduced in this manner is elutriated by gases flowing through the reducing reactor. Introducing the basic oxide into the nickel oxide by use of aqueous solutions is particularly advantageous when the oxide is to be reduced in a fluid bed reactor in which most, if not all, finely divided, solid basic oxide would be elutriated before it could react with the oxide to form an antiagglomerating coating or to be effective as a desulfurizer.

The aqueous solution of the water soluble magnesium or calcium compound can be sprayed on the nickel oxide before the nickel oxide is reduced or the compound can be incorporated in the oxide in any other manner that insures a uniform coating on the nickel oxide. For example, the aqueous solution of the compound or compounds can be added to nickel oxide calcine as it is being cooled in a fluid bed reactor, the vaporization of the water also serving to extract heat from the calcine. Alternatively, the aqueous solution can be added to the oxide through use of blending apparatus. Whatever means are used to coat the nickel oxide with the magnesium or calcium compound such means should provide a uniform coating and insure that the coated nickel oxide contains at least about 0.05 percent, e.g., about 0.1 to 0.2 percent, magnesium or calcium. Nickel oxide uniformly coated with a magnesium or calcium compound such that the nickel oxide contains magnesium and/or calcium within the foregoing ranges can be reduced at temperatures as high as 1100°C. without sticking but, in practice, finely divided basic oxide in amounts up to about 10 percent can be employed as added insurance against lack of coating uniformity or unavoidable problems encountered in commercial practice and to remove a substantial portion of the sulfur in the oxide.

A particularly advantageous embodiment of the present invention is the use of an aqueous magnesium sulfate solution to provide the nickel oxide with the controlled sulfur content and uniform distribution while also insuring that the nickel oxide is provided with a uniform basic oxide coating when the sulfate decomposes during reduction. When magnesium sulfate solutions are employed, the solution is added to the oxide in amounts to adjust the sulfur content of the nickel oxide to between about 0.005 and 0.5 percent, advantageously between about 0.02 and 0.3 percent. In most instances, additional basic oxide will be required. Magnesium sulfate solutions can be added to the nickel oxide by spraying or any other techniques that insure substantially uniform coatings.

Nickel oxide can be reduced at temperatures as low as 500°C. but volatile impurity elimination becomes more effective with increasing temperatures. Improved throughput rates and more effective impurity elimination are achieved at reduction temperatures of about 600°C. or higher, e.g., 750°C. Nickel oxide is advantageously reduced at temperatures of about 800°C., most advantageously between about 850°C. and 1100°C. Reduction at temperatures between about 900°C. and 1000°C. is particularly advantageous in that throughput rates and impurity elimination, particularly lead and/or bismuth, are maximized while problems associated with sticking are minimal. Lead and/or bismuth are most effectively eliminated during reduction at temperatures above about 850°C. At 1000°C., a nickel product containing less than about 0.01 percent lead and less than about 0.002 percent bismuth can be produced whereas the lead and bismuth contents of nickel obtained by reducing the oxide at less than 850°C. temperatures would be about 0.05 and 0.005 percent, respectively. The extent of refining is dependent upon the initial impurity content, the reduction temperature, and the residence time at reduction temperatures, and the extent of actual refining obtained in practice is a matter of balancing product specifications with economics to optimize the various parameters. The use of reduction temperatures in excess of about 850°C. to obtain impurity removal is possible only with use of the basic oxide to prevent agglomeration.

Reduction can be conducted in any commercially available reactor as long as the reactor provides good gas-solid contact to promote the reducing reactions. For example, the process can be conducted in a fluid bed reactor in which a carbonaceous reductant, such as natural gas, coal or oil, is combusted with a free-oxygen-containing gas, which is also employed as the fluidizing medium, to generate the requisite heat and reducing potential or in which a preheated gas, such as hydrogen, carbon monoxide or gaseous mixtures containing hydrogen and/or carbon monoxide are employed as the fluidizing medium, the heating medium, and the reductant. Alternatively, reduction can be conducted in a countercurrently fired rotary furnace. Rotary furnaces provide good gas-solid contact and provide good heat efficiency because the charging end of the furnace can act as a preheating zone and/or the residence time of the feed can be closely controlled by rotation and inclination of the furnace. Gas-solid contact can be increased by use of lifters in the rotary furnace.

In one embodiment, nickel oxide granules containing at least one volatile impurity selected from the group consisting of antimony, arsenic, bismuth, lead, selenium, sulfur, tellurium, tin, and zinc, the total volatile impurity content exceeding about 0.01 percent and the sulfur content being between about 0.005 and 0.5 percent, advantageously between about 0.02 and 0.3 percent, uniformly distributed sulfur for activation purposes, and being coated with a basic oxide in an amount such that the combined magnesium and calcium is at least about 0.1 percent, and up to about 6 percent finely divided basic oxide are continuously fed to a rotary furnace, in which preheating and reducing zones are established, to form a gently tumbling bed. The nickel oxide granules are fed to the preheating zone so that the mixture is transported through the preheating zone to the reducing zone before being discharged from the furnace. The furnace is advantageously equipped with one or more burners in the reducing zone to maintain the gently tumbling bed of the mixture at a temperature between 800°C. and 1100°C., advantageously between about 900°C. and 1000°C., and to generate an atmosphere reducing to nickel oxide and possibly one or more burners of air lances in the preheating zone to generate additional heat for rapid preheating thereby effectively increasing the length of the reducing zone. The atmosphere generated by the burner is made to travel countercurrent to the gently tumbling bed in order to increase the overall efficiency of the process. Any carbonaceous fuel, including natural gas, liquid hydrocarbons and even coal, can be combusted with a free-oxygen-containing gas to generate the requisite amount of heat to maintain the gently tumbling bed in the reducing zone within the aforedescribed temperature range and to generate a reducing atmosphere having a reducing potential equivalent to a carbon monoxide to carbon dioxide ratio of at least about 1:4, and advantageously between about 2:3 and 7:3. Whatever reducing potential is employed the total reducing constituents, e.g., hydrogen and/or carbon monoxide, introduced to the reducing zone should be equivalent to about 1 to 5 times, advantageously about 1.5 to 2.5 times, the stoichiometric amount required to react with and reduce the nickel oxide. The foregoing control can be achieved by partial combustion of a carbonaceous fuel or by complete combustion of a fuel with the reducing constituents, e.g., ammonia, hydrogen, carbon monoxide or precursors thereof (such as natural gas), being introduced separately. Regardless of how the reducing constituents are introduced into the reducing zone, the overall efficiency of the process can be enhanced by combusting unreacted reducing constituents in the preheating zone or combusting the exit gases for heat recovery. Under the foregoing conditions of temperature and atmosphere, nickel oxide is rapidly and substantially completely reduced, e.g., the reduced metal product contains less than about 0.5 percent oxygen, without encountering sticking or dusting. The reduced metal product is discharged from the furnace under nonoxidizing conditions for subsequent separation of the reduced metal product from the basic oxide.

If a cleaner reduced metal product is desired, the discharged reduced product can be fed under non-oxidizing conditions to a fluid bed reactor to both cool the product and elutriate a preponderant part of the basic oxide from the reduced metal product. Alternatively, the reduced metal product can be cooled under non-oxidizing conditions and then subjected to magnetic separation to provide a product substantially freed of the basic oxide. As an even further alternative, the reduced metal product can be treated with a dilute acid solution to dissolve the basic oxide and to lower the sulfur content.

The nickel product can be, if required, further refined by well known means. For example, the nickel metal granules can be melted to slag any gangue and then cast into easily handled and shipped pigs or granulated to produce nickel granules. Melting can be conducted in an induction unit, in a gas-fired furnace, or in an electric arc furnace, etc. Alternatively, the nickel granules can be dissolved in acid solutions and the dissolved nickel values electrowon. Carbonylation techniques, particularly at elevated pressures, can also be employed to further refine the nickel metal granules if such a highly refined product is necessary.

In order to give those skilled in the art a better understanding of the present invention, the following illustrative examples are given:

EXAMPLE I

Samples of granular nickel oxide, produced by roasting nickel sulfide above its softening temperature (i.e., nickel sulfide was fluid bed roasted at temperatures between 1100°C. and 1200°C.), having a size distribution as follows:

| Distribution, Weight % of Total | Size, Mesh TSS |
|---|---|
| 1.6 | +20 |
| 19 | −20 +35 |
| 23.1 | −35 +48 |
| 47.7 | −48 +65 |
| 8.6 | −65 | and analyzing in weight percent as follows:

| Ni | Cu | Fe | S | Ca | Mg | $SiO_2$ | Al |
|---|---|---|---|---|---|---|---|
| 77.1 | 0.7 | 0.18 | 0.017 | 0.095 | 0.024 | 0.57 | 0.17 | were mixed with varying quantities of different additives, and the mixtures were fed to an externally heated rotary tube furnace. The additives, which has a size distribution of 100 percent minus 200 mesh TSS, and the amounts of additives employed are shown in Table I. The term "trace" employed in Table I is approximately 200 parts per million (ppm).

The mixtures of nickel oxide and additive were heated to different reducing temperatures for about three hours. During these tests a gaseous atmosphere containing, by volume, 7.8 percent carbon monoxide, 5.3 percent carbon dioxide, 12.1 percent hydrogen, 13.5 percent water vapor and 61.3 percent nitrogen, which atmosphere simulated atmospheres obtained by partially combusting natural gas, was passed through the rotating tube furnace at uniform rate such that upon completion of the test the amount of reductant passing through the furnace was equivalent to two to three times the stoichiometric amount required to reduce nickel oxide. The degree of reduction obtained in terms of the weight percent of oxygen in the final product is reported in Table I for each of the tests. In all instances, the nickel to sulfur ratio in the reduced product was greater than about 9500:1, confirming that the product was refined at least with respect to the sulfur content.

TABLE I

| Additive | Amount of Additive Weight % | Temp. °C. | Increase in −20 +35 mesh fraction, Wt. % | Oxygen in reduced product Weight % |
|---|---|---|---|---|
| Dolomite | Trace | 750 | 9.2 | 7.9 |
| Dolomite | 3% | 750 | 4.0 | 8.9 |
| Dolomite | Trace | 1000 | 67.0 | 2.3 |
| Silica | 3% | 1000 | 56.8 | 1.2 |
| Dolomite | 3% | 1000 | −15.0 | 0.7 |
| Dolomite | 2% | 1000 | −15.9 | 0.6 |
| Magnesia | 3% | 1000 | −4.5 | 2.0 |
| Lime | 3% | 1000 | 6.6 | 1.4 |
| Limestone | 3% | 1000 | 25.2 | 1.5 |
| Magnesium Sulfate* | 0.75% | 1000 | −7.5 | <0.1 |

*Sprayed onto the nickel oxide at 920°C. Other additives well mixed with the nickel oxide before reduction.

During reduction at higher temperatures (e.g., 1000°C.) the average particle size and the distribution thereof should shift downward due to shrinkage induced by sintering. Thus, if no agglomeration occurs, one would expect a decrease of the fraction of the larger particles like the −20 +35 mesh TSS fraction. The presence of agglomeration during reduction is indicated by a positive increase in the fraction of the larger particle sizes. The change of the −20 +35 mesh TSS fraction for each of the tests is reported in Table I.

A number of significant conclusions can be made from the results reported in Table I. First, it is quite clear from the oxygen content of the final products reduced at different temperatures that greatly improved reduction kinetics are realized at the higher reduction temperatures. Second, even at reducing temperatures of only about 750°C., the solid additive must be added in amounts of at least about 0.2 percent in order to minimize sticking and agglomeration. Third, at reducing temperatures of about 1000°C. a 3 percent silica addition is only a little more effective in controlling agglomeration than is only a trace addition of dolomite. Fourth, and highly significantly dolomite becomes more effective at higher reduction temperatures, possibly because at such higher temperatures thermal decomposition of the dolomite is insured. Fifth, lime is more effective in minimizing agglomeration than limestone, possibly because at the reduction temperatures employed limestone is not completely thermally decomposed and the additives must be in the oxide form to be effective. Sixth, magnesia-containing additives are more effective than calcium-containing additives. Seventh, lower amounts of additive are required when added to the nickel oxide as an aqueous solution which insures uniform distribution.

EXAMPLE II

Granular nickel oxide, obtained by roasting nickel sulfide above about 1100°C. to a sulfur content of 0.22, was fed to the charging end of a rotary furnace at a rate of about 450 kilograms per hour (kg/hr) along with 3 percent dolomite. At the discharge end of the furnace natural gas at a rate of about 2.5 standard cubic meters per minute (SCMM) was combusted with about 40 percent of theoretical air for complete combustion to provide an atmosphere reducing to nickel oxide and to maintain the gently tumbling bed at a temperature of about 1000°C. The reduced product contained 0.065 percent sulfur, i.e., substantial desulfurization occurred, and less than about 0.5 percent oxygen, i.e., greater than 97.5 percent reduced. The screen analysis of the feed, the dolomite and the product and the composition of the feed and the product are given in Table II. Calculations based on the results presented in Table II show that the nickel to sulfur ratio was increased to about 1400:1 from about 350:1, a fourfold increase, and the nickel to lead ratio was increased to 32000:1 from 3300:1, almost a tenfold increase, which ratios confirm that substantial refining occurred. The product was melted to dross any gangue constituents as well as any of the basic oxide coating adhering to the reduced product.

TABLE II

| Mesh, TSS, | Screen Analysis, % Wt. | | |
|---|---|---|---|
| | NiO Feed | Dolomite | Nickel Product |
| −10 +14 | 0.5 | 0 | — |
| −14 +20 | 1.5 | 3.1 | 0.2 |
| −20 +28 | 3.7 | 4.4 | 0.7 |
| −28 +35 | 26.3 | 5.0 | 19.8 |
| −35 +48 | 34.1 | 4.3 | 27.2 |
| −48 +65 | 25.4 | 4.4 | 35.0 |
| −65 +100 | 6.4 | 8.8 | 19.7 |
| −100 +150 | 0.8 | 12.4 | 3.7 |
| −150 +200 | 0.3 | 18.7 | 0.6 |
| −200 +325 | 0.3 | 19.1 | 0.6 |
| −325 | 0.7 | 19.8 | 2.4 |

| Element | Composition | |
|---|---|---|
| | Feed, % Wt. | Product, % wt. |
| Ni | 73.0 | 96.2 |
| Cu | 0.52 | 0.66 |
| Co | 0.88 | 1.08 |
| Fe | 0.31 | 0.39 |
| S | 0.22 | 0.07 |
| $O_2$ | 21.8 | 0.08 |
| Pb | 0.022 | 0.003 |
| $SiO_2$ | 0.76 | 0.72 |
| $Al_2O_3$ | 0.21 | 0.21 |
| MgO | 0.03 | 0.1 |
| CaO | 0.11 | 0.29 |

Another test was conducted to show the synergistic effects of the copresence of basic oxide and sulfur in increasing the reduction kinetics and/or the extent of reduction.

A fluid bed roasted nickel oxide containing 0.056 percent sulfur was fed continuously at 135 kg/hr additions to a countercurrently fired kiln using natural gas as fuel and reductant with no dolomite addition being made. A reducing temperature of about 800°C. resulted in excessive agglomeration and a poor reduction of about 55 percent. Decreasing the reduction temperature to about 750°C. decreased agglomeration but resulted in an unacceptable reduction of about 77 percent. Even at an operating temperature as low as 700°C., agglomeration occurred. Additional reductants in the form of water gas to increase the reduction potential of the reducing atmosphere were necessary to obtain a reduction of over 95 percent at substantially lower feed rates of about 110 kg/hr. Thus, in the absence of dolomite, a lower reduction temperature of 700°C. to minimize sticking and a reducing atmosphere enriched with water gas to increase the reducing potential of the atmosphere were required to obtain 95 percent reduction, but even with these concessions the throughput rate had to be lowered to 110 kg/hr., only one-fourth of the feed rate realized when a 3 percent dolomite addition was employed. The ratio of throughput rates for the tests with and without the dolomite addition would be even greater if the test with the dolomite addition employed a reducing atmosphere enriched with reducing constituents to the same extend that the reducing atmosphere of the test without the dolomite addition was enriched in reducing constituents. The foregoing tests show that dolomite and sulfur additions cooperate to permit the use of high reduction temperatures at which temperatures exceptionally high throughput rates are obtained.

EXAMPLE III

The effects of sulfur in increasing the reduction kinetics are shown in this Example. Nickel oxide samples having the composition and particle size distribution given in Example I were mixed with 3 percent dolomite and the mixtures were then reduced at different temperatures in an atmosphere containing 20 percent hydrogen and 80 percent nitrogen (which simulated a partially combusted atmosphere containing hydrogen and carbon monoxide. The times to reduce the oxide by 75 percent and 95 percent (i.e., the time required to eliminate 75 percent and 95 percent of the oxygen from the oxide) were ascertained. The times and temperatures are reported in Table III.

For comparative purposes, nickel oxide discharged from the fluid bed roasters into fluid bed coolers was activated with sulfur by adding sulfuric acid to the fluid bed coolers in amounts to provide the nickel oxide with a sulfur content of about 0.3 percent. Samples of the sulfur activated nickel oxide were reduced in the identical manner described above at various temperatures to ascertain the time required for 75 percent and 95 percent reductions. These results are also reported in Table III.

Comparison of the results for non-activated and sulfur-activated nickel oxide confirms that sulfur activation increases the reduction kinetics at all temperatures. The reduced products, after elutriation, contained less than about 0.05 percent sulfur. Thus, the sulfuur activation increased the reduction kinetics while the dolomite addition not only minimized sticking but also aided sulfur removal after the sulfur had served its catalytic function.

ample I. The conditions and results are reported in Table IV.

TABLE IV

| Reduction Conditions | | Metal Product | |
|---|---|---|---|
| Temp., °C. | Time, Hrs. | $O_2$, Wt. % | Pb, Wt. % |
| Initial oxide | | 21 | 0.035 |
| 750 | 6 | 0.2 | 0.034 |
| 800 | 6 | 0.1 | 0.023 |
| 900 | 6 | 0.1 | 0.013 |
| 950 | 4 | 0.1 | 0.008 |
| 950 | 6 | <0.1 | 0.005 |
| 1000 | 3 | <0.1 | 0.006 |
| 1000 | 6 | <0.1 | 0.008 |

The results in Table IV confirm that at temperatures of 750°C. the nickel to lead ratio is increased to about 2800:1 from about 2100:1 in the oxide, i.e., more than about 25 percent of the lead is eliminated during the reductionrefining operation. However, at temperatures above 800°C., particularly above 900°C., lead elimination becomes materially more effective. The improved reduction kinetics at the high reduction temperatures are also apparent from the results presented in Table IV.

EXAMPLE V

This Example confirms that high reduction temperatures are effective in eliminating impurities, such as antimony, arsenic, bismuth, selenium, tellurium and tin. Nickel oxide having the composition given in Example IV was mixed with 3 percent −200 mesh TSS dolomite and reduced at 900°C. and 1000°C. for six hours in the manner described in Example I. The results are reported in Table V. The results in Table V confirm that high reduction temperatures, particularly reduction temperatures above 900°C., are highly effective in eliminating impurities.

TABLE III

| | Time (Mins.) for Various % Reductions | | | | | | | | | |
|---|---|---|---|---|---|---|---|---|---|---|
| | 600°C. | | 700°C. | | 800°C. | | 900°C. | | 1000°C. | |
| Activation | 75% | 95% | 75% | 95% | 75% | 95% | 75% | 95% | 75% | 95% |
| No activation | >400 | — | — | — | 200 | — | — | — | 52 | >200 |
| $H_2SO_4$ activation | 52 | 160 | 33 | 120 | 32 | 70 | 31 | 60 | 29 | 50 |

EXAMPLE IV

This Example confirms that reduction of nickel oxide by the process in accordance with the present invention is effective in producing an improved metal product. Samples of granular nickel oxide having the following analysis:

| Ni Wt.% | Cu Wt.% | Co Wt.% | Fe Wt.% | S Wt.% | Ca Wt.% | Mg Wt.% | $SiO_2$ Wt.% | Al Wt.% |
|---|---|---|---|---|---|---|---|---|
| 75.0 | 0.64 | 0.76 | 0.29 | 0.05 | 0.2 | 0.021 | 0.035 | 0.15 |
| O Wt.% | As Wt.% | Pb Wt.% | Bi ppm | Sb ppm | Se ppm | Te ppm | Sn ppm | Zn ppm |
| 21.0 | 0.12 | 0.035 | 33 | 74 | 15 | 4 | 17 | <5 | were mixed with 3% minus 200 mesh TSS dolomite and were reduced at different temperatures for varying lengths of time in the same manner as described in Ex-

Table V

| | Reduction Temp., °C. | Bi | Sb | Analysis (ppm) Se | Te | Sn | As |
|---|---|---|---|---|---|---|---|
| Calculated Metal | | 42 | 94 | 19 | 5 | 22 | 1646 |
| Reduced Metal | 900 | 49 | 17 | 15 | 4 | 17 | 750 |
| Reduced Metal | 1000 | 19 | 11 | 13 | 4 | 16 | 730 |

EXAMPLE VI

Numerous prior art processes for reducing nickel oxide at lower temperatures (e.g., below 750°C.) with relatively pure hydrogen to increase reduction kinetics exist. The present Example confirms that atmospheres generated by the partial combustion of hydrocarbons when used in conjunction with higher reduction temperatures and sulfur activation are kinetically more active than pure hydrogen at lower reduction temperatures. Besides improving reduction kinetics, reducing atmosphers generated in situ minimize gas regeneration and inefficient gas preheating operations.

Samples of unactivated nickel oxide having the composition given in Example I were reduced at 710°C. under a pure hydrogen atmosphere and the time required to reach predetermined reduction levels was recorded. Other samples, some activated and others not, were reduced at 1000°C. in an atmosphere containing only 20 percent hydrogen and 80 percent nitrogen (which simulated partially combusted natural gas containing 20 percent plus carbon monoxide) and again times for given degrees of reduction were recorded. In all instances, except where magnesium sulfate was used for activation, 3 percent minus 200 mesh TSS dolomite was added to the nickel oxide. The results are given in Table VI.

TABLE VI

| Temp. | Reducing gas % $H_2$ | Activation | Time (minutes) for various % reduction | | |
|---|---|---|---|---|---|
| | | | 50% | 75% | 99% |
| 710 | 100 | none | 22 | 32 | 90 |
| 1000 | 20 | none | 24 | 48 | >120 |
| 1000 | 20 | 1.5% $H_2SO_4$ | 21 | 32 | 64 |
| 1000 | 20 | 0.75% $MgSO_4$ | 19 | 29 | 60 |

It can be seen that low oxygen products can be obtained at a 50 percent higher throughput rate at the higher reduction temperatures while avoiding problems associated with regeneration and reheating of spent reducing gases.

EXAMPLE VII

This shows the synergistic effect of addition of magnesium sulfate to the nickel oxide. A magnesium sulfate solution in an amount to provide a magnesium sulfate addition equivalent to 0.75 percent was sprayed to the nickel oxide having the composition given in Example I in a fluid bed at 920°C. This oxide was subsequently reduced for three hours in a kiln at 1000°C. with no additions as described in Example I. As shown in Table VII the addition prevented agglomeration.

TABLE VII

| Additive | % increase on −20 + 35 mesh fraction | % O in product nickel |
|---|---|---|
| none | 67.0 | 2.3 |
| 3% dolomite | −15.0 | <0.1 |
| 0.75% $MgSO_4$ | −7.5 | <0.1 |

The $MgSO_4$ addition appreciably improved the reduction kinetics as compared to the test which provided no activation while minimizing sticking as shown by the decrease in the −20 +35 mesh fraction. In both tests in which an additive was employed the nickel to sulfur ratio in the product was lower than in the oxide feed which proved that substantial desulfurization had occurred.

EXAMPLE VIII

Granular nickel oxide produced by roasting nickel sulfide above its softening temperature was chlorinated at a temperature above 1100°C. to provide a low copper nickel oxide feed. The feed and about 4 percent dolomite were fed at a rate of about 340 kg/hr to a countercurrently fired kiln operated in the manner and under the conditions described in Example II. The results are reported in Table VIII from which it will be noted that the product was partially desulfurized, that the nickel to lead ratio was increased 2.5 times, and that the oxide was 98 percent reduced.

TABLE VIII

| | Feed, % | Product, % |
|---|---|---|
| Ni | 77.66 | 97.14 |
| Co | 0.52 | 0.73 |
| Cu | 0.20 | 0.28 |
| Fe | 0.01 | 0.01 |
| $SiO_2$ | 0.35 | 0.73 |
| $Al_2O_3$ | 0.21 | 0.28 |
| CaO | 0.35 | 0.56 |
| Pb | 0.004 | 0.002 |
| S | 0.03 | 0.03 |

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for reducing and refining particles of a non-ferrous oxide of at least one metal selected from the group consisting of nickel or cobalt which comprises: establishing a moving bed of the non-ferrous metal oxide particles containing at least one volatile impurity selected from the group consisting of antimony, arsenic, bismuth, lead, selenium, sulfur, tellurium, tin, and zinc, the total volatile impurity content exceeding about 0.005 percent and the sulfur content being between about 0.005 percent and 0.5 percent, and of at least one additive selected from the group consisting of calcium oxide, magnesia or compounds heat decomposable thereto, the additive being present in small but effective amounts to react with the non-ferrous oxide to form an antiagglomerating coating on a substantial portion of the particles to minimize sticking in the moving bed, and contacting the moving bed with a reducing atmosphere at a temperature high enough to reduce the non-ferrous oxide to metal and to lower the volatile impurity content.

2. The process as described in claim 1 wherein the non-ferrous oxide is cobalt oxide.

3. The process as described in claim 1 wherein the non-ferrous oxide is nickel oxide.

4. The process as described in claim 3 wherein the nickel oxide contains more than about 0.1 percent of the volatile impurity.

5. The process as described in claim 3 wherein the additive is added to the nickel oxide as an aqueous solution of at least one water-soluble compound of a member selected from the group consisting of magnesium or calcium.

6. The process as described in claim 5 wherein the nickel oxide is reduced and refined in a fluid bed reactor.

7. The process as described in claim 6 wherein a preheated gas containing at least one member selected from the group consisting of hydrogen or carbon monoxide is passed through the fluidized bed to maintain the bed at temperature and to provide the atmosphere reducing to nickel oxide.

8. The process as described in claim 6 wherein a fuel and a free-oxygen-containing gas are combusted within the fluid bed to provide the heat required to maintain the reduction temperature and to generate the reducing atmosphere.

9. The process as described in claim 6 wherein the additive is magnesium sulfate dissolved in water.

10. The process as described in claim 7 wherein sufficient aqueous solution is added to the nickel oxide to provide the nickel oxide with a magnesium or calcium content of between about 0.05 percent and 2 percent.

11. The process as described in claim 3 wherein the nickel oxide contains material amounts of copper and the nickel oxide is chlorinated at a temperature between about 500°C. and 1200°C. to increase the nickel to copper ratio to more than about 75:1.

12. The process as described in claim 6 wherein the nickel oxide is reduced at a temperature of at least about 500°C.

13. The process as described in claim 6 wherein the nickel oxide is reduced at a temperature of at least about 600°C.

14. The process as described in claim 6 wherein the nickel oxide is reduced at a temperature of at least about 700°C.

15. The process as described in claim 6 wherein the nickel oxide is reduced at a temperature between about 850°C. and 1100°C.

16. The process as described in claim 6 wherein the nickel oxide is reduced at a temperature between about 900°C. and 1000°C.

17. The process as described in claim 3 wherein the nickel oxide is reduced and refined in a counter-currently fired rotary furnace in which a fuel and a free-oxygen-containing gas are combusted to maintain the moving bed at reducing temperatures and to generate reducing atmospheres.

18. The process as described in claim 17 wherein the additive is a finely divided solid and is added in amounts of at least about 0.2 percent, based on the weight of the nickel oxide.

19. The process as described in claim 18 wherein the basic oxide is added in amounts of less than about 10 percent, based on the weight of the nickel oxide.

20. The process as described in claim 17 wherein the additive is added to the nickel oxide as an aqueous solution of a water-soluble compound of magnesium or calcium.

21. The process as described in claim 20 wherein the aqueous solution is added to the nickel oxide in amounts sufficient to provide the nickel oxide with a magnesium or calcium content of at least about 0.1 percent.

22. The process as described in claim 20 wherein the aqueous solution is added to the nickel oxide in amounts sufficient to provide the nickel oxide with a magnesium or calcium content of at least about 0.05 percent.

23. The process as described in claim 20 wherein finely fivided basic oxide is incorporated in the moving bed in amounts of up to 10 percent, based on the weight of the nickel oxide.

24. The process as described in claim 23 wherein the nickel oxide contains material amounts of copper and the nickel oxide is chlorinated at a temperature between about 500°C. and 1200°C. to increase the nickel to copper ratio to more than about 75:1.

25. The process as described in claim 23 wherein the nickel oxide is reduced at a temperature of at least about 500°C.

26. The process as described in claim 23 wherein the nickel oxide is reduced at a temperature of at least about 600°C.

27. The process as described in claim 23 wherein the nickel oxide is reduced at a temperature of at least about 700°C.

28. The process as described in claim 23 wherein the nickel oxide is reduced at a temperature between about 850°C. and 1100°C.

29. The process as described in claim 23 wherein the nickel oxide is reduced at a temperature between about 900°C. and 1000°C.

30. A process for treating granular nickel sulfide containing at least one volatile impurity selected from the group consisting of antimony, arsenic, bismuth, lead, selenium, tellurium, tin and zinc to produce a refined nickel metal product which comprises: roasting the granular nickel sulfide at a temperature between about 500°C. and 1200°C. in a free-oxygen-containing atmosphere to provide granular nickel oxide that is partially refined by volatilization of substantial amounts of the impurity, adjusting the sulfur content and distribution in the nickel oxide to provide an average sulfur content of between about 0.005 and 0.5 percent, establishing and maintaining a moving bed of the nickel oxide granules and at least one additive selected from the group consisting of magnesia, calcium oxide and compounds heat decomposable thereto, the additive being incorporated in the bed in small but effective amounts to react with the nickel oxide to form an antiagglomerating coating on a substantial portion of the nickel oxide granules, at a temperature between about 800°C. and 1100°C.; and contacting the moving bed with an atmosphere reducing to nickel oxide whereby nickel oxide and the additive react to form an antiagglomerating coating on a substantial portion of the nickel oxide granules, substantial amounts of the volatile impurity remaining in the nickel oxide are volatilized, and the nickel oxide granules are reduced to a refined nickel metal.

31. The process as described in claim 30 wherein the moving bed is established in a rotary furnace and the additive is incorporated in the moving bed as a finely divided solid in an amount between about 0.2 and 10 percent, based on the weight of the nickel oxide being reduced.

32. The process as described in claim 30 wherein the moving bed is established in a rotary furnace and the additive is incorporated in the moving bed as a finely divided solid in an amount between about 3 and 6 percent, based on the weight of the nickel oxide being reduced.

33. The process as described in claim 30 wherein the additive is incorporated in the nickel oxide as an aqueous solution of at least one water-soluble compound of at least one member selected from the froup consisting of magnesium and calcium.

34. The process as described in claim 33 wherein the water-soluble compound is magnesium sulfate.

35. The process as described in claim 31 wherein the moving bed is established in a rotary furnace and additional amounts of the additive are incorporated in the bed in the form of a finely divided solid.

36. The process as described in claim 31 wherein the moving bed is established in a fluid bed reactor.

37. The process as described in claim 31 where the moving bed is established in a rotary furnace with the heat required to maintain the bed at temperatures between about 500°C. and 1200°C. and the atmosphere reducing to nickel oxide being generated by combusting a carbonaceous fuel with a free-oxygen-containing gas in the furnace and to establish countercurrent flow of the products of combustion to the moving bed.

38. The process as described in claim 31 wherein the reduction temperature is between about 900°C. and 1000°C.

39. The process as described in claim 31 wherein the nickel sulfide contains copper and the granular nickel oxide, before reduction, is chlorinated at a temperature between about 500°C. and 1200°C. to lower the copper content of the nickel oxide granules so that the nickel to copper ratio is greater than about 75:1.

40. The process as described in claim 31 wherein the reduced nickel product is melted and cast.

41. The process as described in claim 31 wherein the reduced nickel product is dissolved to provide a nickel-containing solution from which nickel is electrowon.

42. The process as described in claim 31 wherein the reduced nickel product is carbonylated to produce nickel carbonyl which is decomposed to provide a carbonyl nickel product.

43. The process as described in claim 31 wherein the reduced nickel product is melted and then granulated to produce nickel granules.

44. The process as described in claim 31 wherein the atmosphere reducing to nickel oxide contains reducing constituents in an amount of about 1 to 5 times the stoichiometric amount required to reduce nickel oxide.

45. The process as described in claim 31 wherein the atmosphere reducing to nickel oxide contains reducing constituents in an amount of about 1.5 to 2.5 times the stoichiometric amount required to reduce nickel oxide.

46. The process as described in claim 31 wherein the total volatile impurity content is at least about 0.1 percent.

47. The process as described in claim 31 wherein the volatile impurity is lead.

48. The process as described in claim 31 wherein the volatile impurity is bismuth.

* * * * *